Oct. 29, 1957 W. C. ELDER ET AL Re. 24,384

HOSIERY

Original Filed April 11, 1957

INVENTORS

WALTER C. ELDER

DELOS M. ELDER

BY Jones & Young

AGENTS

United States Patent Office

Re. 24,384
Reissued Oct. 29, 1957

24,384

HOSIERY

Walter Clifton Elder and Delos Montgomery Elder, Burlington, N. C.

Original No. 2,799,151, dated July 16, 1957, Serial No. 652,311, April 11, 1957. Application for reissue July 17, 1957, Serial No. 676,461

7 Claims. (Cl. 66—172)

Matter enclosed in heavy brackets [ ] appears in the original patent but forms no part of this reissue specification; matter printed in italics indicates the additions made by reissue.

The present invention relates to improved hosiery, and more particularly to improved half hosiery for men having a new and novel top portion therewith.

For many years half hosiery for men such as, for example, army or work socks, have consisted of a knitted body and foot portion and a top portion possessing a ribbed appearance. Such hosiery is normally designated as mock rib or accordian socks. Hosiery of this type long has been in use, but have been objectionable in that the socks do not remain encased in snug engagement about the calf of the wearer. This characteristic is due to the fact that the mock rib top portion does not possess true elastic characteristics. As a result, after one or two wearings the top portion of the sock is stretched completely out of shape.

In an effort to overcome this basic disadvantage possessed by hosiery of this type, a rubber thread or yarn has been knitted into the top portion, in whole or in part, to impart elasticity thereto permitting the top to function as a garter to insure the proper engagement of the hose about the calf of a user. While this form of hosiery imparted the desired elasticity, the presence of the rubber yarn created new problems, both from the standpoint of manufacture as well as usage. From the knitting operation, the use of the rubber yarn required a very close control on the machine. This is due to the fact that the rubber yarn must be knitted in a tensioned state, and such tension, due to the inherent characteristics of rubber, constantly changes.

From a user's standpoint, the presence of the rubber yarn in the top portion causes the top portion of the sock to bind the wearer's ankle excessively, and oftentimes results in a chafing and other discomforts to the wearer. Moreover, the rubber yarn is easily broken and oftentimes, when stretching the sock to put it on, the rubber yarn is broken, thus destroying the elasticity of the top portion. This same loss of elasticity also occurs quite frequently due to the wearing and continued washing of the socks, since rubber inherently deteriorates at a rapid rate.

It has been found that these foregoing and related disadvantages can be eliminated by providing hosiery for men in which stretchy, synthetic yarn such as, for example, of the nylon type, is knitted with non-elastic yarn for the formation of the hosiery top, thereby providing the desired rib appearance, and imparting the necessary elasticity thereto with all possibility of binding and breakage being eliminated, and which requires no constant control during its manufacture.

It is therefore a principal object of the present invention to provide a new, novel, and improved hosiery.

Another object of the present invention is to provide hosiery that will possess the same appearance as hosiery heretofore manufactured with none of the disadvantages.

A further object of the present invention is the provision of hosiery which will snugly engage the wearer's leg and calf at all times, with no binding thereof.

Still another object of the present invention is the provision of hosiery having a truly elastic top portion which will retain its elasticity at all times.

Yet another object of the present invention is the provision of hosiery that requires no close control during its knitting operation to insure the production of uniform hosiery.

Another object of the present invention is the provision of hosiery that can be manufactured more cheaply than heretofore.

Other and additional objects will become manifest from the ensuing description taken in conjunction with the accompanying drawing.

Broadly stated, the hosiery of the present invention comprises a knitted leg and foot portion and a ribbed top portion, at least a plurality of the courses of said top portion being of stretchy, synthetic yarn.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawings, in which.

Figure 1:
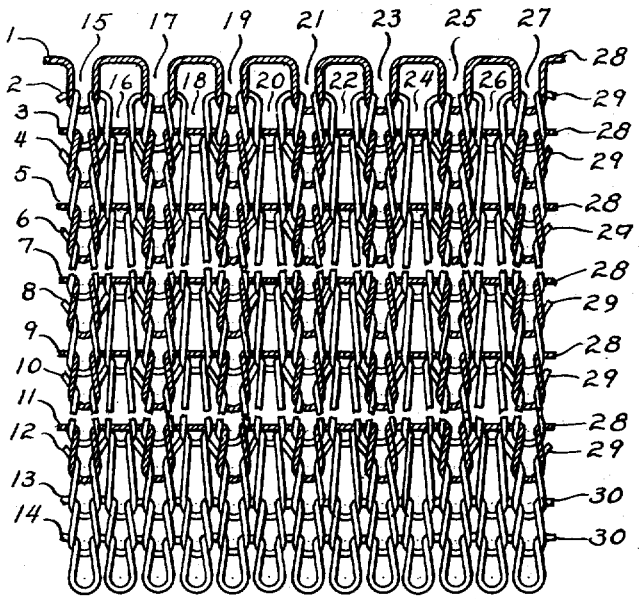
Figure 1 is an enlarged illustration of the fabric in which the stretchy, synthetic yarn is incorporated with the non-stretchy yarn in the top portion to impart the elastic characteristics thereto with a few wales and courses of fabric being included.

Referring now to the drawings, and with particular reference to Fig. 1, a fragmentary knitted fabric is shown. The fabric illustrates the incorporation of the synthetic, stretchy yarn with the inelastic yarn to form the top portion. Several courses illustrating the body portion of the hosiery are likewise included.

The illustrated fabric, as shown, comprises courses 1 to 14, said courses including wales 15 to 27. The base fabric may be knitted with a synthetic, stretchy yarn 28 and an inelastic yarn 29 on a conventional circular knitting machine to form the hosiery top in any manner insuring the incorporation of the stretchy yarn therein with the resulting desired stretch, proper retaining characteristics, and rib appearance being obtained. After the formation of the top portion, inelastic yarn is used throughout to complete the formation of the hosiery.

As illustrated, the fabric is formed by knitting the stretchy yarn 29 with alternate needles only in the alternate odd-numbered wales 15, 17, 19, 21, 23, 25, and 27 while the inelastic yarn 30 is knitted on all needles in wales 15 to 27. By knitting the stretchy yarn 29 with the alternate needles, the even numbered wales 16, 18, 20, 22, 24, and 26 are forced to the outer face of the fabric 10 to produce the desired rib effect.

This knitting operation is conventional and is accomplished by feeding the inelastic yarn 29 to all the needles at the main feeding station of the machine, while the stretchy yarn 28 is fed to and knitted by the alternate needles at the auxiliary feeding station. The stretchy yarn 28 is fed into the hooks of the alternate needles under tension consistent with the knitting of uniform fabric. Due to the inherent memory characteristics of the stretchy yarn, a constant knitting tension may be applied with virtually no periodic adjustment thereof being required. Thereafter, throughout a plurality of courses sufficient to knit the amount of fabric necessary for the formation of the desired top, the stretchy yarn 29 is fed at the auxiliary side to the alternate needles while the inelastic or non-stretchy yarn is fed to all needles at the main side. As illustrated, this operation is continued through courses 1–12. After the knitting of course 12, the top portion is complete, and the body of the hosiery is now ready to be knitted. In this operation, lighter weight inelastic yarn may, if desired, be substituted for the inelastic yarn used in the top formation during the formation of the body portion of the hose. To accomplish this, yarn 30 is substituted and knitted in courses 13 and 14, which diagrammatically represent the body portion of hosiery fabrics.

The fabric, as shown, therefore, is essentially a two-feed fabric with alternate even numbered courses 2, 4, 6, 8, 10, and 12 being knitted with the inelastic or non-stretchy yarn 29 with all needles, while the intermediate odd numbered courses 1, 3, 5, 7, 9, and 11 are knitted by alternate needles only engaging and knitting the stertchy yarn 28. Courses 13 and 14 diagrammatically represent courses of the body portion of the hose knitted in the conventional manner to produce a non-ribbed appearance and in which the same or lighter weight inelastic yarn 30 may be employed.

It is to be noted that it is within the spirit and scope of the present invention to form a top portion in which only a necessary number of courses are knitted with the stretchy yarn sufficient to retain the hosiery in the desired wearing state. The remaining courses of the top portion then will have inelastic yarn substituted for the stretchy yarn at the auxiliary feeding station to complete the formation of the top. If it is desired to produce hosiery having a ribbed effect throughout, the top portion is knitted in the manner hereinbefore described with the stretchy yarn being used in a plurality or all of the courses of the top portion. After the completion of the top portion, the same or lighter weight inelastic yarn is fed at the auxiliary station for knitting on alternate needles with the same type yarn being fed at the main station on all needles to complete the formation of the body portion and imparting a rib appearance thereto.

Figure 2:
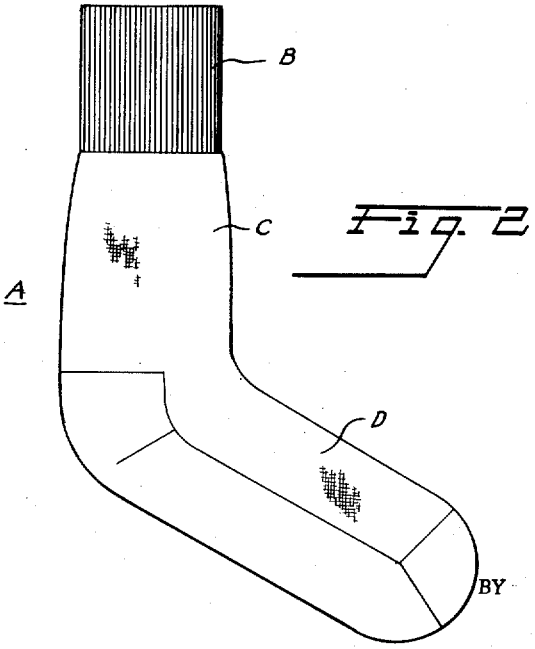
Figure 2 is a side elevation of hosiery for men made in accordance with the present invention.

Referring now to Fig. 2, the hosiery knitted in the manner hereinbefore described and generally designated by reference letter A is shown. The hosiery A comprises the top portion B, the leg portion C, and the foot portion D. The top portion B, as shown, includes the combination of the stretchy, synthetic yarn and the non-stretchy or inelastic yarn in the manner hereinbefore described. The remaining body portion C and foot portion D are knitted with the inelastic or non-stretchy yarn, and may be either in rib or plain form. Similarly, the top portion B, as hereinbefore indicated, may only have a part thereof knitted with the stretchy, synthetic yarn, with the remaining part of the top portion being knitted with the inelastic yarn to impart the rib appearance thereto.

The invention as thus described may be applied to hosiery, such as men's, women's, and children's socks and stockings known as half hose, which extend as far as part way up on the calf of the wearer, such as, for example, army or work socks, or argyles, as well as hosiery of the type known as ankle socks. The hosiery A made in accordance with the preesnt invention allows the top portion to sustain the hosiery as strongly and firmly as the rubber-containing hosiery made heretofore with absolutely no constriction or binding of the wearer's legs. Similarly, the hose A will retain its elasticity indefinitely due to the memory characteristics of the stretchy yarn employed therein. The cost of manufacture of hosiery of this type is less and the knitting operation requires no careful control to positively insure proper tensioning of the yarn.

By the term "stretchy synthetic yarn" as employed herein and in the appended claims, it is meant to include any type of synthetic thermoplastic multi-filament or mono-filament yarns in which the stretchy characteristics have been imparted thereto by either crimping, and heating the yarn while in a crimped state to render it permanently elastic, by twisting the yarn to a ply twist through setting the twist with heat and then untwisting to form the elastic yarn, or such as the Z twist or plied S and Z twist yarn, or by curling, and in which the yarn made by any of these methods is characterized by a latent torque, curl, coil, or spiral which before knitting has stretchable characteristics. Examples of such yarn are nylon, which is preferred, Dacron (a condensation polymer of terephthalic acid and ethylene glycol), Orlon (polyacrylonitrile), etc. This term does not include any synthetic yarns or fibers which inherently possess elastic properties, such, for example, synthetic rubber.

By the term "inelastic," or "non-stretch," or "non-synthetic" yarn employed herein and in the appended claims in producing the top portion and the foot portion of the hosiery, it is intended to define any yarn possessing no ability to stretch materially under tension, and which will return to its normal shape when the tension has been released. Such yarns include any inelastic yarn such as, for example, wool, cotton, silk, rayon, acetate, nylon, Orlon, Dacron, or combination inelastic yarn made from any of the foregoing. The preferred inelastic yarn is any of the foregoing which has been spun, and a particular preference is had for cotton or wool.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The present application is a continuation-in-part of our copending application Serial No. 626,174, filed December 4, 1956, which is now abandoned.

We claim:

1. A self-supporting knitted article of hosiery comprising a foot, a leg, and an elastic top, said top having at least a plurality of courses alternately of stretchy nylon yarn and inelastic non-synthetic yarn, said inelastic yarn being knitted at every wale and said stretchy yarn being knitted at least at alternate wales and floated across intervening wales.

2. A self-supporting knitted article of hosiery comprising a foot, a leg, and an elastic top, said top having all of its courses alternately of stretchy nylon yarn and an inelastic non-synthetic yarn, said inelastic yarn being knitted at every wale and said stretchy yarn being knitted at least at alternate wales and floated across intervening wales.

3. A self-supporting knitted article of hosiery comprising a foot, a leg, and an elastic top, said top having at least a plurality of courses alternately of stretchy nylon yarn and cotton yarn, said cotton yarn being knitted at every wale and said stretchy yarn being knitted at least at alternate wales and floated across intervening wales.

4. A self-supporting knitted article of hosiery comprising a foot, a leg, and an elastic top, said top having all of its courses alternately of stretchy nylon yarn and cotton yarn, said cotton yarn being knitted at every wale and said stretchy yarn being knitted at least at alternate wales and floated across intervening wales.

5. A self-supporting knitted article of hosiery comprising a foot, a leg, and an elastic top, said top having at least a plurality of courses of stretchy, synthetic, thermoplastic yarn having stretchy characteristics imparted thereto and *a plurality of courses of* inelastic yarn, said inelastic yarn being knitted at every wale and said stretchy yarn being knitted at least at alternate wales and floated across intervening wales.

6. A self-supporting knitted article of hosiery comprising a foot, a leg, and an elastic top, said top having at least a plurality of courses alternately of stretchy, synthetic, thermoplastic yarn having stretchy characteristics imparted thereto and spun inelastic yarn, said inelastic yarn being knitted at every wale and said stretchy yarn being knitted at least at alternate wales and floated across intervening wales.

*7. A self-supporting knitted article of hosiery comprising a foot, a leg, and an elastic top, said top having at least a plurality of courses of stretchy, synthetic, thermoplastic yarn having stretchy characteristics imparted thereto and a plurality of courses of inelastic yarn, said inelastic yarn being knitted at every wale and said stretchy yarn being knitted at selected wales.*

References Cited in the file of this patent or the original patent

UNITED STATES PATENTS

| | | |
|---|---|---|
| 1,823,053 | Lawton | Sept. 15, 1931 |
| 2,102,359 | Martel | Dec. 14, 1937 |
| 2,131,720 | St. Pierre | Sept. 27, 1938 |
| 2,361,152 | Saussaman et al. | Oct. 24, 1944 |
| 2,564,245 | Billion | Aug. 14, 1951 |
| 2,574,029 | Foster | Nov. 6, 1951 |
| 2,679,739 | Brooks | June 1, 1954 |
| 2,755,616 | Weller | July 24, 1956 |